United States Patent [19]

Iacobucci

[11] Patent Number: 4,622,310

[45] Date of Patent: Nov. 11, 1986

[54] INORGANIC PHOSPHATE AEROGELS AND THEIR PREPARATION

[75] Inventor: Paul A. Iacobucci, Tarrytown, N.Y.

[73] Assignee: Stauffer Chemical Company, Westport, Conn.

[21] Appl. No.: 685,357

[22] Filed: Dec. 24, 1984

[51] Int. Cl.$^4$ .................. B01J 27/14; B01J 27/18; C01B 15/16; C01B 25/16

[52] U.S. Cl. .................. 502/208; 423/306; 423/308; 423/309; 423/311; 502/209; 502/210; 502/211; 502/212; 502/213; 502/214

[58] Field of Search .............. 423/308, 311, 306, 309; 502/211, 212, 213, 214, 208, 209, 210

[56] References Cited

U.S. PATENT DOCUMENTS

| | | | |
|---|---|---|---|
| 3,147,227 | 9/1964 | Hansford | 423/311 |
| 3,271,299 | 9/1966 | Kearby | 208/114 |
| 3,342,750 | 9/1967 | Kearby | 208/114 |
| 4,364,855 | 12/1982 | McDaniel et al. | 423/308 |
| 4,478,805 | 10/1984 | Langer et al. | 423/311 |
| 4,481,302 | 11/1984 | McDaniel et al. | 502/210 |
| 4,535,070 | 8/1985 | McDaniel et al. | 502/208 |

*Primary Examiner*—John Doll
*Assistant Examiner*—Wayne A. Langel
*Attorney, Agent, or Firm*—Vivienne T. White

[57] ABSTRACT

The invention is directed to inorganic phosphate aerogels and the method of preparing such inorganic phosphate aerogels which are characterized by high surface areas and high pore volume. The preparation comprises reacting an inorganic alkoxide or metal salt with a phosphate to form a gelled or colloidal material which is further treated with a fluid at or above its critical temperature and pressure to extract the solvent which is then dried to remove surface water.

30 Claims, No Drawings

1

INORGANIC PHOSPHATE AEROGELS AND THEIR PREPARATION

BACKGROUND OF THE INVENTION

1. Field of the Invention

The invention is directed to a method of preparing inorganic phosphate aerogels and, in particular, inorganic phosphate aerogels in the form of granular material characterized by high surface area and pore volume.

2. Relevant Art

Inorganic oxide aerogels, specifically metal oxide aerogels, are well known in the art as suitable for a variety of applications such as catalysts, catalyst supports, absorbents, chromatographic column packing, anti-caking agents, viscosity enhancers, pigments, opacifiers, as well as ceramics, smoke suppressants, abrasives, dentifrice polishing agents and the like. The product of the instant application can be similarly utilized and can additionally be used as a surfactant.

The preparation of aerogels, in general, and silica aerogels, in particular, has been well documented in the art. U.S. Pat. Nos. 2,249,767; 2,672,833; 2,093,454 and 4,327,065 all disclose processes for producing aerogels. In addition, an article entitled *Inorganic Oxide Aerogels* appearing in Advances in Colloid and Interface Chemistry, Vol. 5, pages 245–273 (1976) published by Elsevier Scientific Publishing Co., Amsterdam, also describes methods of producing various aerogels.

It has been known to produce such aerogels by hydrolyzing salts, or alkoxides, in the presence or absence of a catalyst, generally an acid or base, to form a gel which is washed with water and then solvent exchanged with an alcohol prior to conventionally drying in an autoclave at the critical temperature and pressure of the solvent.

Co-pending application Ser. No. 565,937 discloses a process of preparing inorganic oxide aerogels wherein the solvent is extracted from the aged aerogel in an autoclave using an extraction fluid.

U.S Pat. Nos. 3,271,299 and 3,342,750 describe the preparation and use of an alumina-aluminum phosphate gel which is prepared by reacting aluminum chloride with phosphoric acid and ethylene oxide. This prior art technique produces a granular product which is sensitive to water and difficult to form into a catalyst shape since it loses a substantial part of its surface area during the forming process.

U.S. Pat. Nos. 3,271,299 and 3,342,750 describe the preparation and use of an alumina-aluminum phosphate cogel which is prepared by reacting aluminum chloride with phosphoric acid and ethylene oxide.

SUMMARY OF THE INVENTION

It has been discovered that inorganic phosphate aerogels characterized by high pore volume and surface area can be prepared. The method of preparation comprises:

(a) reacting in a solvent medium at least one inorganic alkoxide or salt with a source of phosphate ions to produce a solvent-containing gel;

(b) contacting the gel in an autoclave with a fluid above the critical temperature and pressure of the fluid to extract the solvent; and (c) optionally drying the inorganic phosphate aerogel produced.

Preferably, in the practice of the invention, after step (b) the autoclave is depressurized at a rate necessary to maintain the temperature above the critical temperature of the fluid for the time necessary to prevent condensation.

Generally, in the practice of the invention, upon reacting the alkoxide or salt with the phosphate ions, the reaction mixture produced is allowed to age for a time, although ageing is not a requirement. Usually ageing can range from 1 minute to over several days.

The crystalline, solid, dry, metal phosphate product of the disclosed invention has a higher than normal surface area and pore volume.

DETAILED DESCRIPTION OF THE INVENTION

The instant invention is directed to obtaining inorganic phosphate aerogels which will generally comprise some amount of oxide but which are predominately phosphates in composition and are characterized by high surface area and high pore volume. Primarily metal phosphate aerogels corresponding to metals of Groups II, III, IV, V, VI, VIIB and Group VIII of the Periodic Table of Elements appearing in the Condensed Chemical Dictionary (9th Edition) and aerogels which are combinations of such metal phosphates are prepared in the manner disclosed.

The invention's starting material is comprised of one or more inorganic metal alkoxides, or metal salts (hereinafter the term "inorganic alkoxides" covers salts unless otherwise specified) which are generally dissolved in a solvent and reacted with a source of phosphate ions to produce phosphate alcogels. The solvent is extracted in a pressurized vessel with a fluid above the critical temperature and pressure of the fluid to produce aerogels. For instance, aerogel compositions such as $Ti_3(PO_4)_4/Si_3(PO_4)_4$; $AlPO_4/Si_3(PO_4)_4$; $Si_3(PO_4)_4$; $Zn_3(PO_4)_2$; $Zn_3(PO_4)_2/Si_3(PO_4)_4$; $AlPO_4$; $Ti_3(PO_4)_4$; and $Zr_3(PO_4)_4/Si_3(PO_4)_4$ can be produced using the method disclosed herein.

In accordance with the present invention, an inorganic aerogel comprising metal oxides and metal phosphates is prepared by reacting at least one inorganic metal alkoxide in a solvent medium with a source of phosphate ions. After extraction of the product, the resulting metal oxide-metal phosphate material (hereinafter, the terms "inorganic phosphate" or "metal phosphate" will encompass the product which will contain amounts of the oxide of the metal) may be used in a variety of chemical processes.

The phosphate ions which are reacted with the inorganic metal oxide may be derived from a phosphorus-containing acid such as the phosphoric, phosphorus and phosphonic acids. These acids may be characterized as having the formula:

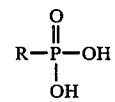

wherein R represents a hydroxyl group, hydrogen or an organic radical such as hydrocarbon radicals including alkyl, cycloalkyl, aryl, aralkyl or alkaryl and the like, containing from 1 to 12 carbon atoms. Suitable phosphorus-containing acids can include phosphoric and/or phosphorous (including hypo, meta and pyro forms thereof) acid, methylphosphonic acid, ethylphosphonic acid, hexylphosphonic acid, phenylphosphonic acid, alkylsubstituted-phenylphosphonic acid, cyclohexylphosphonic acid, alkylsubstituted-cyclohexylphosphonic acid, and the like. The halogen substituted forms of the aforementioned acids may also be used such as, for example, monofluorophosphoric acid ($H_2PO_3F$). The preferred acids are phosphoric and phosphorous acids. Soluble salts of these acids such as the ammonium, alkyl ammonium, sodium and potassium salts thereof may also be used.

In the practice of the invention one or more inorganic metal alkoxides or salts thereof may be used as the starting material for preparing the aerogels. It is, however, preferred to utilize metal alkoxides.

The inorganic metal alkoxides used herein may include any alkoxide which contains from 1 to 20 carbon atoms and preferably 1 to 5 carbon atoms in the alkoxide group, which is soluble in the liquid reaction medium. Representative alkoxides to form the aerogels are as follows:

Silica Aerogels

Generally $C_1$-$C_5$ alkoxides such as tetramethyl silicate and tetraethyl silicates, and $SiCl_4$.

Zinc Aerogels

Generally $C_1$-$C_5$ alkoxides as for instance diisopropoxy zinc and chloride salts.

Zirconia-Silica Aerogels

Generally $C_1$-$C_5$ alkoxides such as tetra-isopropoxy zirconium, tetra sec-butoxy zirconium, tetra-ethoxy zirconium; tetra-methyl silicate, tetra-ethyl silicate.

Alumina-Silica Aerogels $C_1$-$C_5$ alkoxides.

Titania-Silica Aerogels $C_1$-$C_5$ alkoxides.

Alumina Aerogels $C_1$-$C_5$ alkoxides, and chloride salts of aluminum.

The criteria for the starting material are inorganic metal alkoxides or metal salts which will dissolve in the specified medium or solvent. Preparation of metal alkoxides is disclosed in *Metal Alkoxides* by Bradley, Mehrotra and Gaur, Academic Press (1978) incorporated herein by reference. This starting material is dissolved in water, if possible, or an inorganic solvent, preferably an alcohol and most desirably a $C_1$-$C_5$ alcohol or isomers thereof. In the practice of the invention it is preferable to utilize an alcohol which corresponds to the alcohol of the metal alkoxide being dissolved. Group IIA and B metals tend to form polymeric alkoxides which are insoluble in alcohols after isolation. In such instances it may be necessary to prepare the alkoxide in-situ with the alcohol.

The medium utilized in the process generally should be a solvent for the inorganic alkoxide or alkoxides which are utilized, if present, and should be soluble in the supercritical fluid. The amount of solvent utilized will determine the density of the finished aerogel.

Generally, in the process of the invention, the concentration of the inorganic alkoxide or metal salt should be from about 2% to about 50% (based on the total volume of the reactants utilized). Preferably the concentration should be from about 2% to about 25%. At lower concentrations, gelation will not generally occur and at higher concentrations it is contemplated that a heavier gel will be formed having less pore volume and surface area. It is desirable to produce a gel having the least amount of solids using the most amount of solvent to achieve the highest surface area and pore volume possible.

Generally, the inorganic alkoxide and source of phosphorus-containing ions are reacted in the presence of a suitable organic solvent and minor amounts of water (deionized preferably and generally some water is added with the source of phosphate ions as water of hydration) at a temperature ranging from ambient to the boiling point of the reaction mixture, usually in the range of 20° to about 100° C. for a sufficient period of time to complete the desired reaction, usually for a period of 1 to 4 hours. The molar ratio of inorganic alkoxide to phosphate ions charged to the reaction mixture varies according to the specific inorganic alkoxide being reacted. Generally, a molar ratio within the broad range of 0.10 to 10.0 is within the scope of the invention. Preferably, the relative amounts of reactants will be adjusted to give an inorganic phosphate concentration of at least 50 wt. % so that the molar ratio of organic alkoxide to phosphate ions charged to the reaction mixture will preferably be in the range of 2 to 1. The amount of water utilized in the reaction is that calculated to hydrolyze the inorganic alkoxide in the reaction mixture that is not consumed by the source of phosphate ions. Usually a 50 percent molar excess of water is added to ensure complete reaction. The inorganic phosphate composition prepared in the above manner will generally contain 1 to 100 wt. % inorganic phosphate and will preferably contain 1 to 90 wt. % inorganic phosphate.

It is within the scope of the invention to prepare the phosphate gel without the use of an organic solvent. In such instances, as described below, the gel is produced by the reaction of the organic salt or alkoxide and a source of phosphate ion and an amount of water necessary to insure complete reaction. Likewise it is also known to produce the gel by reaction of the above materials in the presence of not only water, but preferably of a suitable organic solvent. The term "medium" utilized herein will, therefore, refer not only to an organic solvent but also to water which is equivalent thereto in the process disclosed.

All methods known in the art for preparing inorganic phosphate gels can be utilized in the process disclosed herein. For instance, processes as disclosed in U.S. Pat. Nos. 3,271,299; 3,342,750 3,904,550; 4,219,444; 4,307,214; 4,364,854; 4,364,855; 4,397,761; and 4,397,765, all incorporated herein by reference, can be used in the process disclosed.

The usual method disclosed in the art for preparing phosphate gels is by the neutralization of a strong acidic medium obtained by the combining of an inorganic metal salt, generally an aluminum salt, and a source of phosphate ions. A precipitate of a true hydrogel is thereby formed. The art also suggests the formation of the gel at a higher pH in order to obtain a higher surface area product.

The reaction is preferably conducted in the presence of an organic liquid which is inert to the reactants and acts as a solvent for the system. Suitable solvents include, among others, the $C_1$-$C_5$ alcohols such as methanol, ethanol, 1-propanol, n-propanol, n-butanol, isobutanol, sec-butanol, and t-butanol. The amount of solvent used may range from 1 to 25, preferably 1 to 12 volume parts per volume part of alkoxide.

In the preparation of the phosphate aerogel product, which is substantially an inorganic phosphate product, the metal to phosphate ratio should be less than or equal to stoichiometric. At a ratio (metal/P) greater than stoichiometry, the oxide of the metal will be present as a reaction product in greater amounts. In such instances the hydrolysis product will compete with the reaction for forming metal to phosphate bonds. The water available for the hydrolysis reaction will be added water and/or water of hydration. A high $PO_4$ concentration with respect to the metal (a less than 1:1 ratio) will tend to decrease the surface area of the final product. It is therefore preferable to limit the amount of water available where a greater than one-to-one ratio exists with respect to the metal to phosphate ion.

After reacting to form either the alcogel or hydrogel product (depending on the process used to form the gel), it is advantageous but not necessary to complete the neutralization or the gelation process with some ageing of the gel. This ageing can range from one minute to over several days.

As is disclosed above, the process for preparing the inorganic phosphate gel can comprise a system wherein little or no water is utilized and a system wherein water is the hydrolysis medium for preparing the gel. Where the system utilized comprises the use of substantial amounts of water, it will be necessary to solvent exchange for the water prior to extraction of the solvent to produce the aerogel product.

Prior to extracting the solvent it is desirable to remove excess solvent from the alcogel to decrease the amount of solvent that must be extracted. This process step, while not a requirement of the process, is prudent to reduce processing time and energy requirements. Simply decanting the excess liquid is sufficient.

In the practice of the invention the various components (metal salt or inorganic alkoxide source of phosphate ions and optionally a solvent) are charged to a reaction vessel. Generally, the alkoxide, or metal salt thereof is initially dissolved in a solvent. In some situations, however, it may be more desirous to slowly dissolve the alkoxide, or metal salt in the solvent prior to reacting with the phosphate ion source to form the gelled or colloidal material.

The treatment of the alcogel for conversion to aerogel constitutes the second major step and is carried out, in practice, in a pressurized system such as an autoclave.

The solvent ladened gel or colloid which is formed in the practice of the invention is placed in an autoclave where it is contacted with a fluid above its critical temperature and pressure by allowing the supercritical fluid to flow through the material solid and liquid until the solvent is no longer being extracted by the supercritical fluid. The critical temperature and pressure of the solvent being extracted is therefore never exceeded.

In performing the invention, various fluids can be utilized at their criticial temperature and pressure. For instance, fluorochlorocarbons typified by Freon ® brand fluorochloromethanes and ethanes, ammonia, sulfur dioxide, nitrogen oxide and carbon dioxide, are all suitable for use in practicing the invention. Carbon dioxide is the preferred critical fluid for the invention. Typically the extraction fluids are fluids which are gases at atmospheric conditions (room temperature and pressure). The criteria for the extraction fluid is that it be inert to the metal phosphate, dissolve the alcohol being removed and preferably have a low critical temperature, pressure, and toxicity, and be nonflammable. In addition the critical temperature and pressure of the extraction fluid is below that of the solvent being extracted.

During the extracting process in the autoclave the extraction fluid is constantly being recovered and replaced by clean fluid. The clean fluid can be fresh extraction fluid or recycled extraction fluid which has been treated to remove contaminants. The recovered fluid can be visually checked to determine whether the extraction process has been completed by allowing some of the exiting fluid to escape. If condensation occurs (generally alcohol) it indicates the need for further extraction, therefore, the extraction process has not been completed. After extraction is completed, optionally the solid is then further contacted with the fluid above the critical temperature and pressure for an additional period of time to insure complete removal of alcohol and substantially any water after which the rate of depressurization of the autoclave is preferably maintained to keep the temperature at or above the critical temperature of the supercritical fluid.

In some instances it may be necessary to wash the precipitated gel or colloid prior to treatment in the autoclave. The washing is generally necessary to remove free ions when the starting material is a metal salt. The washing also can be considered a solvent exchange where the solvent is exchanged for the water. In such instances the washing solvent must be soluble in the supercritical fluid at conditions near or above the critical temperature and pressure of the fluid. In such instances it is preferable to use the same solvent used to dissolve the alkoxide or metal salt.

The inorganic metal phosphate aerogel after completion of the extraction process is dried at a temperature of from about 80° C. to about 100° C. to remove surface water from the final product since the extraction process does not remove all the water present.

The solid, dry, granular, inorganic metal phosphate which remains after treatment in the manner disclosed herein exhibited a high surface area and pore volume. The density of the supercritical fluid used to extract the solvent and water when necessary should have a density corresponding to the density of the alcohol being removed thus causing the density gradient between the fluid and solvent to be substantially nil. Lowering the temperatures or increasing the pressure will increase the density of the supercritical fluid, though the temperature must of course remain above the critical temperature of the fluid, preferably at $T=1.1\ T_c$ which is the minimum heat requirement that should be maintained. $T_r$ (1.1) is the reduced temperature expressed as the absolute temperature over the critical temperature. By varying the temperature and pressure, therefore, it is possible to vary the pore size, pore volume and surface area of the aerogel produced.

Although the inorganic metal phosphate product of the invention is primarily obtained as a granular material, it is possible to obtain inorganic phosphate aerogels in a monolithic form. In such instances, however, the flow of the supercritical fluid should be extremely slow and the heat-up and cool-down time should be prolonged.

The following embodiments are provided as examples of preparing various aerogels in accordance with the invention and are not to be considered as limiting the scope of the present disclosure. It is contemplated that aerogels comprising more than one inorganic phosphate having varying compositional ranges are within the scope of the invention.

EXAMPLE 1

An alcogel of AlPO$_4$ was prepared by mixing 50 ml of sec-butanol with 14 ml of aluminum sec-butoxide to give a clear solution. After mixing for 10 minutes, 6.3 ml of 85% H$_3$PO$_4$ (phosphoric acid) were rapidly added to the stirring solution. This resulted in a rapid formation of gel which immediately occluded all of the alcohol solvent. A large exotherm was evidenced but the reaction was allowed to proceed adiabatically. Thereafter, 30 ml of sec-butanol were added to cover the gel which had a pH of approximately 3.5. The gel was covered and allowed to age at room temperature for 3 days.

A 100.5 g amount of AlPO$_4$ gel and butanol were placed in a one liter autoclave. A continuous flow of supercritical CO$_2$ (T=40° C., P=3500 psig) was used to extract the butanol leaving the fluffy white powder as the product in the autoclave. After 4.5 hrs. of extraction, the autoclave was depressurized and the product collected. The fluffy white solid had a surface area (BET) of about 390 m$^2$/g and a pore volume of about 4.2 cc/g as determined by Hg intrusion. The x-ray diffraction pattern of the solid determined it to be AlPO$_4$ which had a high cristobalite structure. The Al/P ratio was 0.593.

EXAMPLE 2

In a 600 ml beaker, 200 ml of sec-butanol with 25 ml of aluminum tri-sec-butoxide were mixed. When the materials were completely mixed, a phosphoric acid mixture containing 4.3 ml of 85% H$_3$PO$_4$ and 1 ml of DI-water (deionized) was rapidly added to the alcohol mixture with agitation. A soupy solution resulted. Finally, a mixture of 2 ml 85% H$_3$PO$_4$ and 1 ml DI-water was added with mixing. Gelation occurred. The gel was allowed to age for 24 hrs.

The gel was extracted as in Example 1 to yield a white fluffy solid. The aluminum to phosphorus ratio was 1.06.

EXAMPLE 3

In a 600 ml beaker, 200 ml sec-butanol and 18 ml of aluminum tri-sec-butoxide were mixed. When the solution was completely homogenized a phosphoric acid solution containing 4.3 ml of 85% H$_3$PO$_4$ and 1 ml of DI-water was rapidly added to the alcohol mixture with stirring. Gelation occurred. The gel was allowed to age for 24 hours.

The gel was extracted as in Example 1 to yield a white fluffy powder. The aluminum to phosphorus ratio was 1.12.

EXAMPLE 4

In a 600 ml beaker, 200 ml of sec-butanol and 25 ml of aluminum tri-sec-butoxide were mixed. When the above solution was completely homogenized, a phosphoric acid solution containing 4.3 ml of 85% H$_3$PO$_4$ and 2.3 ml of DI-water was added. Gelation occurred and stirring ceased. The gel was allowed to age for 24 hours.

The gel was charged to the one-liter autoclave and pressurized with supercritical CO$_2$. The autoclave conditions were maintained at 40° C. and 3500-4200 psig and recycle of the supercritical CO$_2$ was conducted. The extraction proceeded for 6 hours until alcohol was no longer present in the alcohol receiver. The product was a white fluffy powder. The aluminum to phosphorus ratio was 1.5.

The aerogels prepared in accordance with the processes disclosed herein can be utilized as a porous inert carrier material (support) in polymerization and copolymerization processes wherein a catalyst is impregnated on the support. Such a process is disclosed in U.S. Pat. Nos. 4,219,444 and 4,364,855 previously incorporated herein by reference.

Various methods of impregnating the aerogel supports are known in the art. Two such methods are described in U.S. Pat. Nos. 4,219,444 and 4,364,885.

In addition to being used as supports for polymerization catalysts, the inorganic oxide aerogels of the present invention have a variety of uses as catalyst supports in numerous other chemical processes some of which were previously mentioned and are briefly described below.

The inorganic metal phosphate material may be advantageously used as a support or carrier for catalytic materials which function as hydrocarbon conversion catalysts. Thus, the invention is not based on the use of any particular hydrocarbon conversion catalyst but rather on the combination of inorganic metal phosphate support described herein and one or more of the known metal or metal oxides which catalyze hydrocarbon conversion reactions. In general, these metals or compounds of such metals include Groups IB, IIA, IIIB, IVA, IVB, VB, VIB, VIIB and VIII and the rare earth Lanthanide Series of the Periodic Table of Elements previously mentioned.

For use in desulfurization and denitrogenation of light and heavy petroleum fractions, the inorganic metal phosphate composition of this invention may be combined with 0 to 50, usually 20-30, wt. percent of any of the metal or metal oxides known to promote hydrofining reactions such as the Group VIB and Group VIII metals of the aforementioned Periodic Table which include among others, iron, cobalt, nickel, platinum, palladium, ruthenium, rhodium, osmium, iridium, molybdenum, tungsten and chromium.

For use in hydrocracking, the inorganic metal phosphate composition of this invention may be combined with 0 to 60, usually 10-25, wt. percent of any of the materials known to promote hydrocracking reactions which include, among others, nickel oxide, cobalt oxide, molybdenum oxide, tungsten oxide and zeolites (crystalline alumino silicates). The zeolites may be in the hydrogen or ammonium form or be exchanged with metal ions such as nickel, cobalt, tin, palladium, platinum and rare earths such as cerium, lanthanum, neodymium, praseodymium, etc.

For use in catalytic cracking, the inorganic metal phosphate composition of this invention may be used alone or combined with 0 to 50 wt. percent of any of the materials known to promote cracking reactions which include, among others, zinc, titanium, aluminum, zirconium, cadmium, chromium, vanadium, copper and iron, zeolites exchanged with magnesium, hydrogen, chromium, zinc, platinum, palladium, cobalt, and iron. The zeolites may be in the hydrogen or ammonium form or be exchanged with metal ions prior to combining with the inorganic metal phosphate composition.

For use in reforming, the inorganic metal phosphate composition of this invention may be combined with 0 to 20.0, usually 0.1-5, wt. percent of any of the known metals used to promote reforming catalysts which include, among others, elements from Groups VIB, VIIB, and VIII of the aforementioned Periodic Table such as tungsten, rhenium, ruthenium, iridium, palladium and platinum.

Similarly, for use in hydrogenation, dehydrogenation, aromatization and oxidation, the inorganic metal phosphate composition of this invention may be combined with 0 to 50 wt. percent of any of the catalytic materials known to be useful in the aforementioned processes.

The operating conditions to be employed in the practice of the present invention are well-known and will, of course, vary with the particular conversion reaction desired. The following table summarizes typical reaction conditions effective in the present invention.

| Principal Conversion Desired | Temp. °C. | Reaction Conditions | |
|---|---|---|---|
| | | Pressure Kg/cm$^2$ | Feed Rate V/V/Hr. |
| Hydrofining | 260–426.7 | 3.52–140.6 | 0.1–10.0 |
| Hydrocracking | 232.2–454.4 | 14.1–140.6 | 0.1–10.0 |
| Catalytic Cracking | 371.1–537.8 | 0–3.52 | 0.1–20.0 |
| Catalytic Reforming | 454.4–537.8 | 3.52–70.3 | 0.1–20.0 |

Except in catalytic cracking which was zero, the hydrogen rate was 5,000 to 10,000 scf/bbl (89.1–1,781 SCM/CM) in the above reaction.

The feedstock suitable for conversion in accordance with the invention includes any of the well-known feeds conventionally employed in hydrocarbon conversion processes. Usually they will be petroleum derived, although other sources such as shale oil are not to be excluded. Typical of such feeds are included heavy and light virgin gas oils, heavy and light virgin naphthas, solvent extracted gas oils, coker gas oils, steam-cracked gas oils, middle distillates, steam-cracked naphthas, coker naphthas, catalytically-cracked naphthas, cycle oils, deasphalted residua etc.

In gas phase isomerization, reforming processes, it is known to use molybdena-alumina catalysts or platinum or platinum-rhenium catalysts and other bimetallic catalysts such as platinum-rhenium, and platinum-palladium. High surface area carrier material is impregnated with an aqueous solution containing the required amount of the salts of the catalytic metal or metals. The carrier is dried and reduced in hydrogen at an elevated temperature.

Gas phase oxidation processes such as the oxidation of naphthalene and xylenes to phthalic acids utilize catalytic carrier materials such as the inorganic oxide aerogels of the present invention. The desirable catalysts utilized in these processes are $V_2O_5$, $MoO_3$, Ag, Cu, $PCl_3$ and $BiO_{23}$.

The crystal structure of the prepared metal oxide aerogels are substantially cristobalite.

What is claimed is:

1. A method of preparing inorganic phosphate aerogels comprising: (a) reacting in a solvent medium, a compound comprising at least one metal with a source of phosphate ions to produce a gel; (b) contacting the gel with a fluid above the critical temperature and pressure of the fluid until the solvent is extracted.

2. The method of claim 1 further comprising depressurizing the vessel after step (b) at a rate necessary to maintain the temperature above the critical temperature of the fluid for the time necessary to prevent condensation and to obtain the phosphate acrogel product.

3. The method of claim 1 wherein the metal is selected from Groups II to VI, Groups VIIB and Group VIII of the Periodic Table of Elements.

4. The method of claim 3 wherein the metal is silicon.

5. The method of claim 3 wherein the metal is titanium.

6. The method of claim 3 wherein the metal is aluminum.

7. The method of claim 1 wherein the compound is an alkoxide.

8. The method of claim 1 wherein the compound is a salt.

9. The method of claim 1 further comprising ageing the gel produced in step (a).

10. The method of claim 9 wherein the gel is aged.

11. The method of claim 1 wherein the extraction fluid has a low critical temperature and pressure.

12. The method of claim 1 wherein the solvent used to dissolve the metal containing compound is a $C_1$–$C_5$ alcohol.

13. The method of claim 12 wherein the alcohol is ethanol.

14. The method of claim 12 wherein the alcohol is isopropanol.

15. The method of claim 12 wherein the alcohol is sec-butanol.

16. The method of claim 1 wherein the extraction fluid has a low critical temperature and pressure.

17. The method of claim 1 further comprising drying the inorganic phosphate product of step (b).

18. The method of preparing inorganic phosphate aerogels comprising reacting in a solvent a metal alkoxide with a phosphate to produce a gel with an extraction fluid at not less than the critical temperature and pressure of the extraction fluid such that solvent is extracted and drying the gel to obtain the dried aerogel product.

19. A method of preparing inorganic phosphate aerogels comprising reacting in a solvent a metal containing compound with a phosphate to produce a gel, and contacting the gel with an extraction fluid at not less than its critical temperature and pressure such that solvent is extracted, drying the gel to obtain the dried aerogel product.

20. The method of claim 19 further comprising depressurizing the vessel after extraction of the solvent at a rate necessary to maintain the temperature above the critical temperature of the fluid for the time necessary to prevent condensation and to obtain the solid dry aerogel.

21. An inorganic phosphate aerogel powdered product, produced by the method of claim 1.

22. An inorganic phosphate aerogel powdered product produced by the method of claim 19.

23. The inorganic phosphate aerogel of claim 21 wherein the product is silicon phosphate.

24. The inorganic phosphate aerogel of claim 21 wherein the product is aluminum phosphate.

25. The inorganic phosphate aerogel of claim 21 wherein the product is a zinc phosphate aerogel.

26. The inorganic phosphate aerogel of claim 21 wherein the product is a silicon titanium phosphate complex.

27. The inorganic phosphate aerogel of claim 21 wherein the product is a zirconium-silicon phosphate complex.

28. The inorganic phosphate aerogel of claim 21 wherein the product is a silicon-aluminum phosphate complex.

29. The inorganic phosphate aerogel of claim 21 wherein the product is a metal oxide-metal phosphate.

30. The method of claim 1 wherein the gel is contacted with the fluid in an autoclave.

* * * * *

UNITED STATES PATENT AND TRADEMARK OFFICE
CERTIFICATE OF CORRECTION

PATENT NO. : 4,622,310
DATED : November 11, 1986
INVENTOR(S) : Paul A. Iacobucci It is certified that error appears in the above-identified patent and that said Letters Patent are hereby corrected as shown below:

<u>Col. 3, line 45</u>, "inorganic" should be --organic--;

<u>Col. 8, line 11</u>, "4,364,885" should be --4,364,855--;

<u>Col. 9, line 52</u>, "$BiO_{23}$" should be --$Bi_2O_3$--;

<u>Claim 2, line 5</u>, "acrogel" should be --aerogel--.

Signed and Sealed this

Thirty-first Day of March, 1987

Attest:

DONALD J. QUIGG

Attesting Officer     Commissioner of Patents and Trademarks